United States Patent [19]
Gau et al.

[11] Patent Number: 5,092,756
[45] Date of Patent: Mar. 3, 1992

[54] APPARATUS FOR DEFORMING PIPE LINERS

[75] Inventors: Yimsan Gau, Somerset; James R. Leech, South River, both of N.J.

[73] Assignee: Union Carbide Chemicals & Plastics Technology Corporation, Danbury, Conn.

[21] Appl. No.: 624,972

[22] Filed: Dec. 10, 1990

[51] Int. Cl.5 ............................................. B29C 53/00
[52] U.S. Cl. .................................... 425/343; 425/367; 425/383; 425/392
[58] Field of Search ................ 425/11, 325, 329, 335, 425/337, 343, 363, 367, 383, 385, 392, 396, 403

[56] References Cited

U.S. PATENT DOCUMENTS

| | | | |
|---|---|---|---|
| 3,256,566 | 6/1966 | Campbell | 425/367 |
| 3,619,863 | 11/1971 | Ciabani | 425/343 |
| 4,863,365 | 9/1989 | Ledoux et al. | 425/343 |
| 4,913,910 | 4/1990 | McCarville et al. | 425/396 |
| 4,998,871 | 3/1991 | Ledoux | 425/335 |

Primary Examiner—Jay H. Woo
Assistant Examiner—C. Scott Bushey
Attorney, Agent, or Firm—Clement J. Vicari

[57] ABSTRACT

Apparatus for deforming a pipe liner having a frame including an entry and an exit for the pipe liner passing through the frame and slidably adjustable discs and cylinders which cooperate to deform a pipe liner disposed intermediate the entry and exit, of the frame. The apparatus also includes a system of blocks, guide rods, and a chain assembly which regulate the deforming position of the discs and cylinders.

13 Claims, 5 Drawing Sheets

APPARATUS FOR DEFORMING PIPE LINERS

The present invention relates to an apparatus for reducing the cross sectional area of a thermoplastic pipe liner and more particularly to an apparatus for deforming polyethylene pipe liners.

BACKGROUND OF THE INVENTION

It is well known in the art that rigid pipes, particularly those suffering from decay, can be lined with various plastics in order to restore the use of the pipe and/or to achieve chemical or abrasion resistance.

As representative of the slip lining technique, reference is made to U.S. Pat. No. 4,496,499 issued on Jan. 29, 1985 which utilizes a non-collapsed plastic liner having an outside diameter sufficiently less than the inside diameter of the pipeline to enable drawing the liner through the pipeline section, but sufficiently large so that the liner can be non-destructively radially expanded against the inside wall of the pipeline. The non-collapsed liner is thereafter drawn into the pipe line section until the liner is substantially longitudinally co-extensive with the pipe line section followed by longitudinally stretching the liner within the section. After fixing the liner against longitudinal movement within the section, a bleeding port is opened in the section and the liner is thereafter radially expanded against the inside wall of the pipe line by a warm pressurized fluid to an extent to permanently change the liner's outside diameter from its original size to a size conforming to the inside diameter of the pipe line while bleeding through the bleeding port.

This prior art technique however has several disadvantages. One such disadvantage is the shipping costs involved in transporting the non-collapsed liner. Another disadvantage is the excessive time and criticality of the installation procedure.

In order to eliminate some of the disadvantages the art has resorted to preparation of collapsed liners which can be shipped at much lower costs. The collapsed or deformed liner arrives at the site and is inserted into the decayed pipe in deformed condition. This makes insertion much easier with the collapsed liner. After insertion the liner ends are then capped and inflated to their original configuration by the action of pressurized steam and/or hot water.

The present invention is concerned with an apparatus for deforming pipe liners.

Accordingly it is the object of the present invention to provide an apparatus for deforming pipe liners into shapes which permit easy shipment of the pipe liner and which permits easy insertion of the pipe liner into the pipe to be lined.

Another object of the invention is to provide an apparatus for deforming pipe liners which apparatus is capable of deforming pipe liners in various configurations.

Another object of the invention is to provide a collapsed plastic liner which can be radially expanded in the pipe to be lined with hot pressurized fluids.

These and other objects will become apparent from the description of the invention which follows.

SUMMARY OF THE INVENTION

Broadly contemplated, the present invention provides an apparatus for deforming a pipe liner which comprises in combination a frame, a back plate and a front plate mounted on said frame, two side members extending substantially horizontal along said frame and being disposed intermediate said back plate and said front plate, entry means disposed on said frame for introducing a pipe liner through said frame, deforming means associated with said frame for deforming a liner during its passage through said frame, regulating means for regulating the deforming position of said deforming means relative to said pipe liner, means for preventing flattening out of said pipe liner during deformation by said deforming means and exit means for discharging deformed pipe liner from said frame.

The entry means can include an opening in the front plate which can accommodate the pipe liner to be deformed, an upper and lower roller and two substantially parallel vertical rollers affixed to the front plate all of which surround the outer periphery of the opening in the front plate.

The deforming means include upper and lower shafts rotatably mounted with respect to the frames each supporting a slidably adjustably mounted disc and a cylinder, the disc being affixed to or forming a part of a cylinder mounted on each shaft.

The regulating means includes four blocks, two blocks being fixedly slidably mounted on an oppositely disposed pair of upper guide rods and two blocks each of which are fixedly slidably mounted on an oppositely disposed pair of lower guide rods, each pair of upper and lower guide rods being disposed on opposite sides of the deforming means and being secured to side members of the frame. The regulating means also includes a threaded rod extending through each side member intermediate the guide rods the ends of the guide rods and the end of the threaded rod terminating in a bottom plate extending transverse of the frame. A chain assembly is disposed over the frame in linking arrangement with sprockets affixed to the threaded rod.

Means for preventing the opening of a deformed pipe are also provided which include oppositely positioned rollers disposed on the frame which cooperate with the deforming discs to prevent opening of the deformed pipe during operation.

The exit means include an opening in the back plate which accommodates the deformed liner an upper and lower roller and two substantially parallel rollers affixed to the back plate.

DETAILED DESCRIPTION OF THE PREFERRED EMBODIMENT

The pipe liners which can be deformed (or in which the cross sectional area of the pipe liner can be reduced) are those pipes which are commonly used as pipe liners for decayed pipes. The apparatus however is best utilized in connection with pipes fabricated from thermoplastics especially polyethylene.

Figure 1:
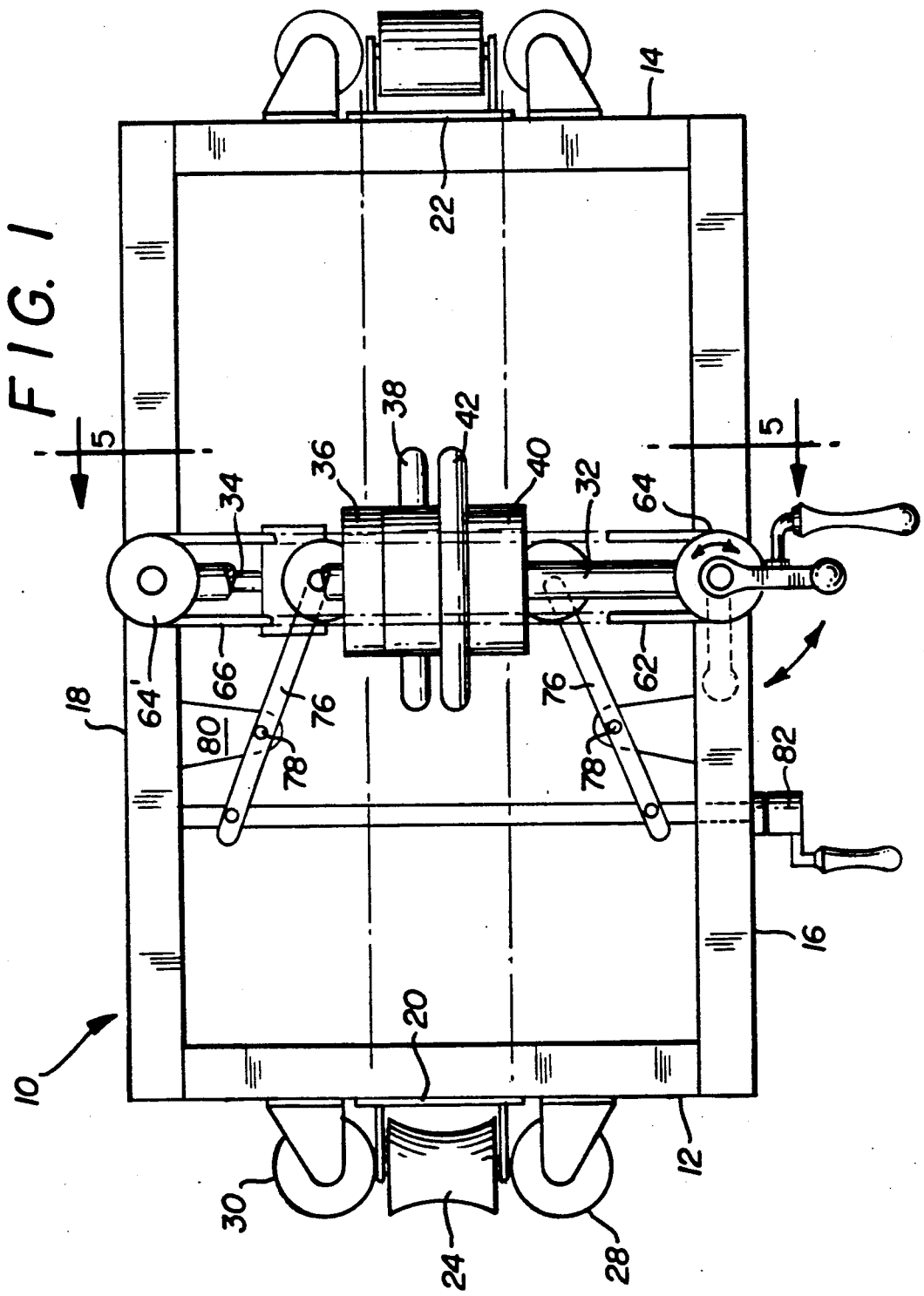
FIG. 1 is a plan view of the apparatus.

Referring to the drawing and particularly to FIG. 1, there is illustrated a frame represented by reference number 10. Frame 10 is generally formed by two oppositely disposed U-shaped members 12, 14 which form the front and back of the frame and which are secured in position by U-shaped side members 16, 18 such as by welding and the like.

Figure 2:
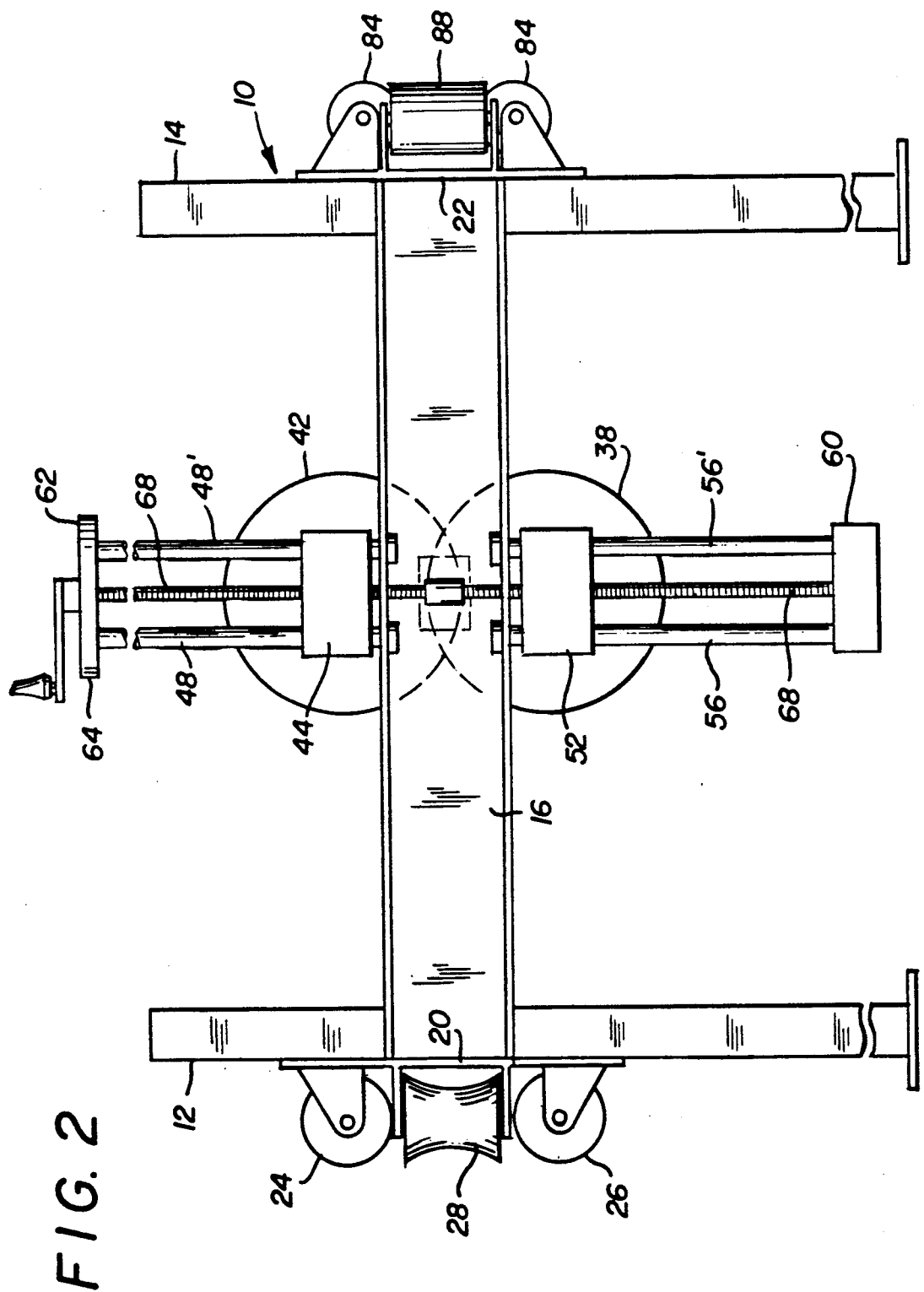
FIG. 2 is a side view of the apparatus.

As shown in FIG. 2 secured to U-shape member 12 is a front plate 20 which is positioned below the top of U-shaped member 12 and terminates about three fourths of the distance from the top towards the bottom of base member 12. The plate can be secured by means of nuts and bolts extending through the plate member 12. Similarly a back plate 22 is positioned on U-shaped member 14 so that assembled components define a cradle of substantially rectangular configuration.

Figure 3:
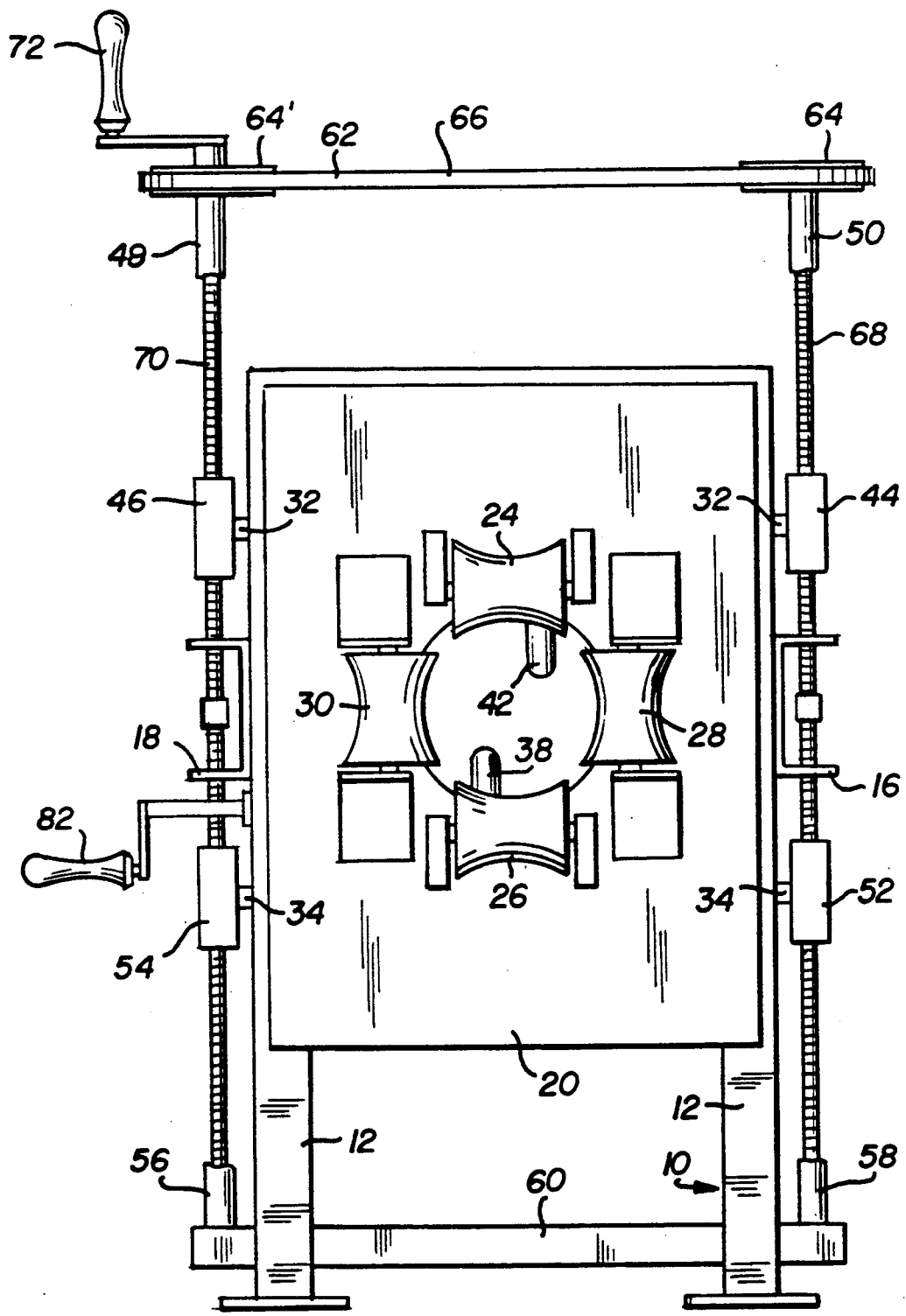
FIG. 3 is a front view of the apparatus.

Front plate 20 defines an opening as shown in FIG. 3 which is sized to permit passage of a pipe liner into and through the apparatus.

In order to maintain the proper feeding direction of the pipe liner through the apparatus, front plate 20 has as system of rollers rotably mounted on the front plate the rollers being disposed around the horizontal and vertical periphery of the opening in front plate 20. Thus, as best seen in FIG. 3 an upper roller 24 and lower roller 26 are rotatably mounted in brackets which are secured to front plate 20. These rollers serve to control the vertical movement of the pipe liner and are vertically adjustable with respect to the front plate by slidably securing the rollers in vertical slots provided in the front plate. Side movement of the pipe liner is also prevented by means of two substantially parallel vertical rollers 28 and 30 which also surround the vertical outer periphery of the opening in front plate 20. Rollers 28 and 30 are also rotatably mounted in brackets which are secured to front plate 20 and these rollers serve to control the horizontal movement of the travelling pipe liner.

Figure 5:
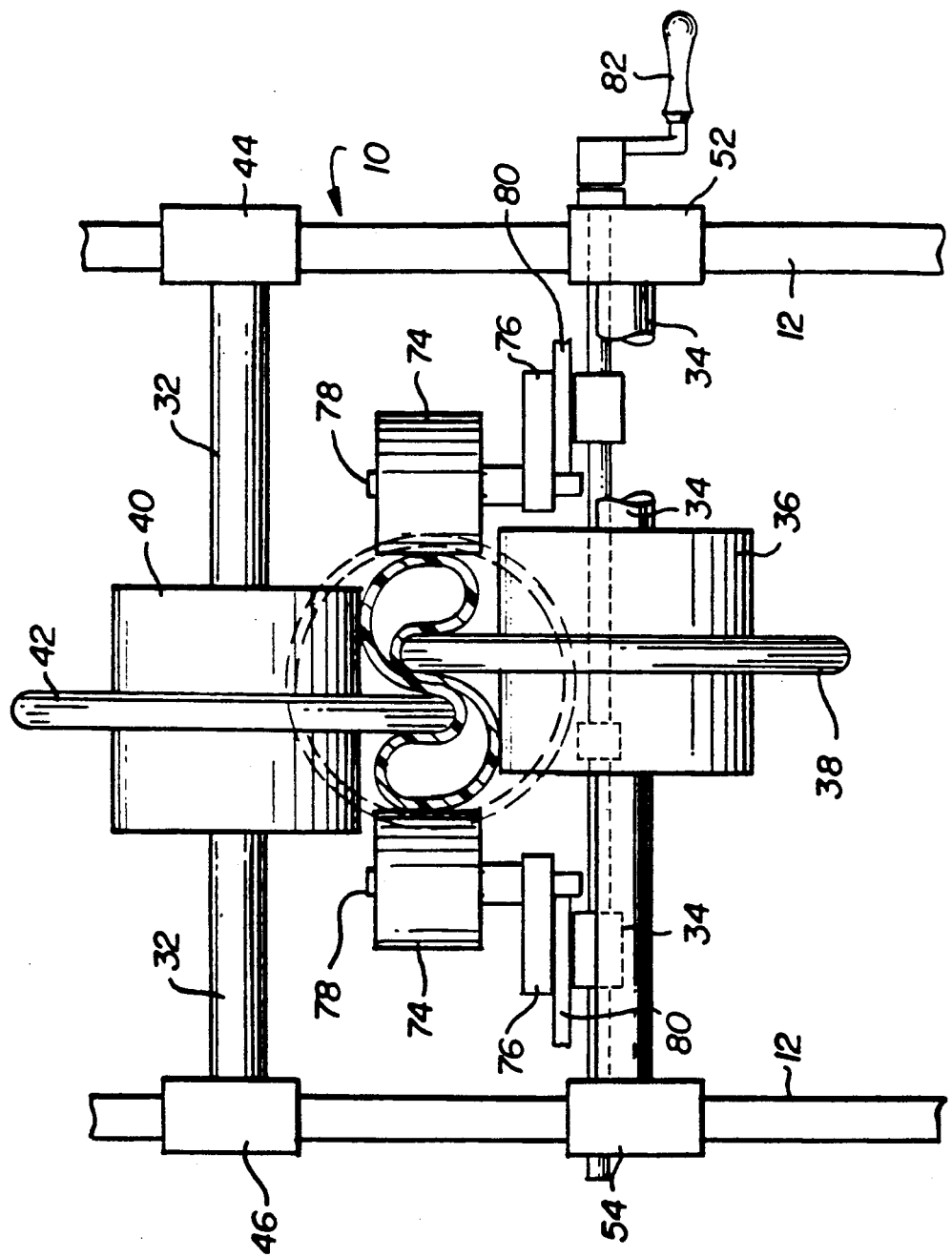
FIG. 5 is a view taken along the 5-5 of FIG. 1.

A deforming means is associated with frame 10 which deforms a pipe liner, preferably a heated pipe liner during its passage through the frame. One type of deforming means is indicated in the drawing particularly FIG. 5 and includes an upper shaft 32 and lower shaft 34 which extends transversely of the frame and which is rotatably mounted with respect to the frame. Each shaft supports a slidably adjustable disc assembly. Thus lower shaft 34 has a cylinder 36 and disc 38 affixed to or forming a part of cylinder 36 both of which are fabricated from materials such as metal which are capable of withstanding the forces and pressures exerted upon them. The disc assembly is slidably adjustably mounted on the shaft and can be moved along the shaft and locked into position by lock bolts and the like. The upper shaft 32 is also provided with a similar disc assembly having a cylinder 40 and disc 42.

The relative positions of the disc assembly can be regulated so that the deforming discs can be synchronously moved relative to each other either vertically towards or away from each other. This can be accomplished by regulating means which as shown in FIGS. 2 and 3 can be two upper blocks 44, 46 each of which are fixedly slidably mounted on an oppositely disposed upper pair of guide rods 48 48' and 50, 50' each pair of guide rods being disposed on opposite sides of deforming discs 38, 42. The lower ends of the guide rods extend through the upper flange of U-shaped members 16, 18 in locking engagement therewith.

Similarly two lower blocks are fixedly slidably mounted on an oppositely disposed lower pair of guide rods 56, 56' and 58, 58', the upper ends of which extend through the lower flange of U-shaped members 16, 18 in locking engagement therewith.

Situated below disc 38 is a base member 60 which extends transversely of frame 10 and into which the lower ends of lower guide rods 56, 56' and 58, 58' are secured. The upper ends of upper guide rods 48, 48' and 50, 50' are mounted in chain assembly 62 which extends transversely across the top of frame 10 in substantially vertical alignment with deforming discs 38, 42.

Thus referring to FIG. 3 chain assembly 62 includes sprockets 64, 64' which are in engagement with chain 66. Rigidly secured to sprocket 64 is a threaded rod 68, which passes through and threadably engages upper block 44 and passes through side member 16, through lower block 52 in threadable engagement therewith. The lower end of threaded rod 68 terminates in base member 60 and rotatably engages base member 60. Threaded rod 68 is provided with oppositely disposed threads at its upper half and lower half so that rotation of threaded rod 68 will cause blocks 44 and 52 to be moved synchronously towards or away from each other depending on the direction of rotation.

Similarly, sprocket 64' is rigidly secured to threaded rod 70 disposed on the opposite side of frame 10. The operation of threaded rod 70 and sprocket 64' is the same as sprocket 64 and threaded rod 68. Thus, threaded rod 70 passes through and threadably engages upper and lower blocks 46 and 54 with the lower end of threaded rod 70 terminating in rotatable engagement with base member 60.

Shafts 32 and 34 are rotatably mounted in blocks 44, 46 and 52, 54 so that when the blocks are moved towards or away from each other by the action of threaded rods 68, 70 the shafts and attached deforming discs can also be moved toward or away from each other in synchronous motion.

Rotation of threaded rods 68, 70 can be effected by turning handle 72 which is attached to sprocket 64' thereby causing rotation of chain 66.

As the pipe liner is deformed by the action of deforming discs 38, 42, it is prevented from flattening out by two main squeezing vertical rollers which are located on either side of the deforming discs. Thus, referring to FIG. 5 it will be seen that a pair of vertical rollers 74 are located on either side of deforming discs 38, 42. Each roller is mounted on one end of a horizontal lever arm 76 which pivots on a vertical shaft 78. The shaft itself is bolted to a supporting plate 80 which is secured such as by welding to the main frame. The other end of lever arm 76 is attached to a threaded rod/bolt arrangement. As with deforming discs 38, 42 vertical rollers 74 are moved in and out simultaneously by turning a single handle 82 attached to the threaded rod.

Figure 4:
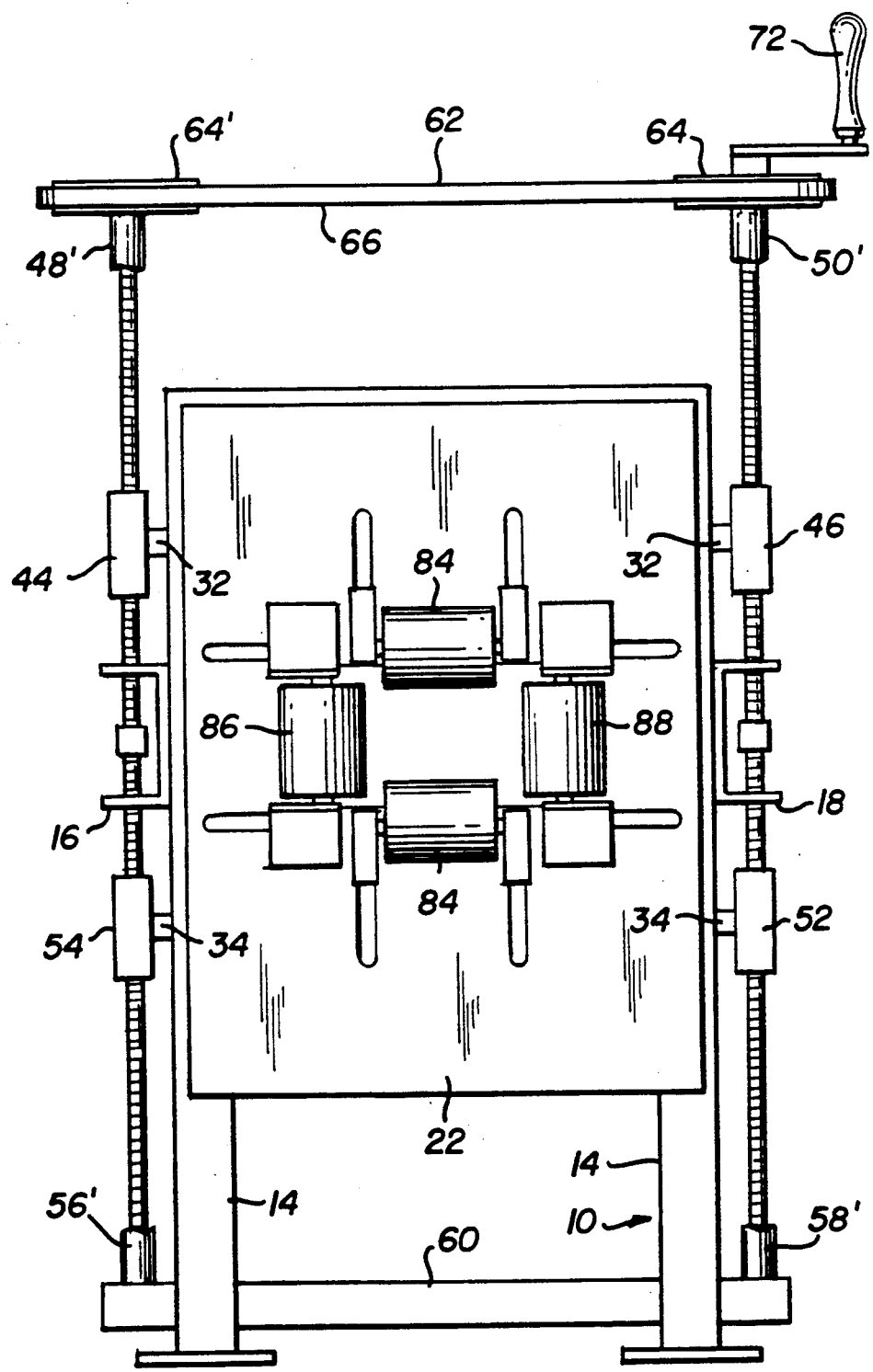
FIG. 4 is a rear view of the apparatus.

The apparatus is also provided with exit means for discharging the deformed pipe liner. Thus referring to FIG. 4 the exit means includes an opening in back plate 22 which is of sufficient size to permit passage of the deformed pipe liner. Back plate 22 has a system of rollers rotatably mounted which include two rollers disposed around the horizontal periphery of the opening and two substantially parallely oppositely disposed vertical rollers. Thus as best seen in FIG. 4 an upper exit roller and lower exit roller 84 are rotatably mounted in brackets which are secured to back plate 22. These rollers serve to control the vertical movement of the deformed pipe liner and are vertically adjustable with respect to the back plate 22 by slidably securing the rollers in vertical slots provided in back plate 22. Side movement of the pipe liner and uncuring of the deformed pipe liner is also prevented by means of two substantially parallel vertical rollers 86, 88 which also surround the vertical outer periphery of the opening in back plate 22.

Rollers 86, 88 are also rotatably adjustably mounted in brackets which are secured to back plate 22.

The apparatus is capable of deforming pipe liners having diameters of from 8 inches to 12 inches. The apparatus however can be easily scaled up to accommodate larger pipe sizes if necessary. Moreover, although not illustrated in the drawing, guided rollers can be mounted within the frame and prior to and after the deforming discs to keep the pipe liner centered within the apparatus and to maintain the shape of the pipe liner.

The pipe liner is preferably softened prior to entry into the deforming apparatus and this can be effected by conventional measures such as by heating with infrared heaters to temperatures ranging from 140° F. to 170° F. At these temperatures, the pipe liner will not buckle while moving through the deforming discs and squeezing rollers, but will be soft enough to be deformed.

To further keep the deformed pipe in its collapsed shape, sprayed cooling tanks equipped with squeezing rollers can be installed between the deforming apparatus and a tape wrapper. The produced deformed liner can be stored in straight length or can be coiled around a properly designed coiler.

In addition, and advantageously, the center lines of the deforming discs can be moved along the shafts to obtain an "S" or "H" deformed shape. If desired, any other shapes can be achieved by changing the design of the deforming discs. For example, if the lower deforming disc is replaced by a flat roller, the deformed pipe liner will have a "U" shape. Moreover a second or third set of deforming discs can be installed as required to further facilitate the deforming operation.

In a typical mode of operation and utilizing the apparatus indicated in the drawing, the apparatus is first adjusted to receive a pipe liner for deformation. Thus, discs 38 and 42 are moved along shafts 32, 34 and locked into position in off-center relationship to provide if desired on deformation an "S" configuration to the pipe liner. Handle 72 is rotated to move the discs either towards or away from each other depending on their starting position and the diameter of the pipe liner to be deformed. Vertical rollers 74 are also adjusted by moving handle 82 which moves rollers 74 either towards or away from each other.

A pipe liner to be deformed is then directed through the entry opening of front plate 20 and thence between the deforming discs, intermediate rollers 74 and thence through the opening in back plate 22. The necessary adjustments to the apparatus can be made with the pipe liner in position such as the relative positions of the rollers at the entry, the relative position of the rollers at the exit etc. When the apparatus is calibrated, the pipe liner can be removed and the pipe liner to be deformed, which leaves an extruder and a puller mechanism, is then heated and introduced into the opening in front plate 20 through the deforming discs 38, 42, and through the exit opening in back plate 22. The deforming discs are then brought together the necessary distance by turning handle 72 a sufficient number of rotations so that the deforming discs compress the softened pipe liner to the desired configuration.

After all adjustments are made, the pipe liner continues its path through the apparatus and deformed pipe is collected for packing or winding.

What is claimed is:

1. An apparatus for deforming a pipe liner which comprises in combination a frame, a back plate and a front plate mounted on said frame, two side members extending substantially horizontal along said frame and being disposed intermediate said back plate and said front plate, entry means for introducing a pipe liner through said frame, deforming means associated with said frame for deforming a liner during its passage through said frame, regulating means for regulating said deforming means relative to said piper liner, means for preventing flattening out of said pipe liner during deformation and exit means for discharging deformed pipe liner from said frame.

2. Apparatus according to claim 1 wherein said entry means include an opening defined by said front plate which accommodates said pipe liner, an upper and lower roller and two substantially parallel vertical rollers affixed to said front plate said rollers surrounding said opening in said front plate.

3. Apparatus according to claim 2 wherein said rollers are adjustably mounted with respect to said opening.

4. Apparatus according to claim 1 wherein said deforming means include an upper shaft and a lower shaft each being rotatably mounted with respect to said frame, each shaft supporting a slidably adjustably mounted disc and a cylinder, said disc being affixed to and forming a part of said cylinder mounted on each shaft.

5. Apparatus according to claim 1 wherein said regulating means includes four blocks, two blocks being fixedly slidably mounted on an oppositely disposed pair of upper guide rods and two blocks each of which are fixedly slidably mounted on oppositely disposed pair of lower guide rods, each pair of upper and lower guide rods being disposed on opposite sides of said deforming means and being secured to said side members, a threaded rod extending through each side member intermediate said guide rods, a bottom plate extending transverse of said frame, said lower guide rods being secured to said bottom plate, said threaded rod being rotatably mounted in said bottom plate and a chain assembly being disposed over said frame in linking arrangement with sprockets affixed to said threaded rod.

6. Apparatus according to claim 1 wherein said means for preventing the opening of said deformed pipe include oppositely positioned rollers disposed on the frame which cooperate with said deforming means to prevent opening of said deformed pipe during operation.

7. Apparatus according to claim 1 wherein said exit means includes an opening defined by said back plate for accommodating a deformed liner and an upper and lower roller and two substantially parallel vertical rollers affixed to said back plate.

8. An apparatus for deforming a pipe liner which comprises in combination a frame, a back plate and a front plate mounted on said frame, two side members extending substantially horizontal along said frame and being disposed intermediate said back plate and said front plate, entry means for introducing a pipe liner through said frame including an opening defined by said front plate which accommodates said pipe liner, an upper and lower roller and two substantially parallel vertical rollers affixed to said front plate said rollers surrounding said opening in said front plate, a deforming means associated with said frame for deforming a liner during its passage through said frame, regulating means for regulating said deforming means relative to said pipe liner, said regulating means includes four blocks, two blocks being fixedly slidably mounted on an oppositely disposed pair of upper guide rods and two blocks each of which are fixedly slidably mounted on oppositely disposed pair of lower guide rods, each pair of upper and lower guide rods being disposed on opposite sides of said deforming means and being secured to said side members, a threaded rod extending through each side member intermediate said guide rods, a bottom plate extending transverse of said frame, said lower guide rods being secured to said bottom plate, said threaded rod being rotatably mounted in said bottom plate and chain assembly being disposed over said frame in linking arrangement with sprockets affixed to said threaded rod, means for preventing flattening out of said pipe liner during deformation and exit means for discharging deformed pipe liner from said frame.

9. Apparatus according to claim 8 wherein said rollers are adjustably mounted with respect to said opening.

10. Apparatus according to claim 8 wherein said deforming means include an upper shaft and a lower shaft each being rotatably mounted with respect to said frame, each shaft supporting a slidably adjustably mounted disc and a cylinder, said disc being affixed to and forming a part of said cylinder mounted on each shaft.

11. Apparatus according to claim 8 wherein said means for preventing the opening of said deformed pipe include oppositely positioned rollers disposed on the frame which cooperate with said deforming means to prevent opening of said deformed pipe during operation.

12. Apparatus according to claim 8 wherein said exit means include an opening defined by said back plate for accommodating a deformed liner, an upper and lower roller and two substantially parallel vertical rollers affixed to said back plate.

13. Apparatus according to claim 12 wherein said rollers are adjustably mounted with respect to said opening.

* * * * *